United States Patent
Lim et al.

(10) Patent No.: US 9,743,426 B2
(45) Date of Patent: Aug. 22, 2017

(54) DYNAMIC DETERMINATION AND SIGNALING OF A RAR WINDOW SIZE TO A COVERAGE ENHANCED LOW COMPLEXITY MACHINE TYPE COMMUNICATION DEVICE

(71) Applicants: Seau Sian Lim, Swindon (GB); Sigen Ye, Whitehouse Station, NJ (US); Shin Horng Wong, Chippenham (GB); David Bhatoolaul, Swindon (GB)

(72) Inventors: Seau Sian Lim, Swindon (GB); Sigen Ye, Whitehouse Station, NJ (US); Shin Horng Wong, Chippenham (GB); David Bhatoolaul, Swindon (GB)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 42 days.

(21) Appl. No.: 14/690,448

(22) Filed: Apr. 19, 2015

(65) Prior Publication Data
US 2016/0309506 A1    Oct. 20, 2016

(51) Int. Cl.
| H04W 4/00 | (2009.01) |
| H04W 74/00 | (2009.01) |
| H04W 76/02 | (2009.01) |
| H04W 74/08 | (2009.01) |

(52) U.S. Cl.
CPC ...... *H04W 74/006* (2013.01); *H04W 74/0833* (2013.01); *H04W 76/021* (2013.01)

(58) Field of Classification Search
None
See application file for complete search history.

(56) References Cited

U.S. PATENT DOCUMENTS

| | | | |
|---|---|---|---|
| 2009/0180436 A1* | 7/2009 | Vujcic | H04L 5/0091 370/330 |
| 2010/0040001 A1* | 2/2010 | Montojo | H04W 72/04 370/329 |
| 2011/0014922 A1* | 1/2011 | Jen | H04W 74/002 455/450 |
| 2013/0034059 A1* | 2/2013 | Lee | H04W 74/006 370/328 |
| 2013/0114516 A1* | 5/2013 | Koo | H04B 15/00 370/329 |
| 2014/0313999 A1* | 10/2014 | Xu | H04W 72/042 370/329 |
| 2015/0016312 A1* | 1/2015 | Li | H04W 74/0833 370/280 |
| 2015/0117374 A1* | 4/2015 | Wu | H04W 74/0833 370/329 |
| 2016/0073292 A1* | 3/2016 | Fan | H04W 28/06 370/230 |
| 2017/0019930 A1* | 1/2017 | Lee | H04W 76/02 |

* cited by examiner

*Primary Examiner* — Bob Phunkulh
(74) *Attorney, Agent, or Firm* — Harness, Dickey & Pierce, P.L.C.

(57) ABSTRACT

In one example embodiment, a base station includes a processor configured to determine a window size indicating for how long a random access response transmission by the base station is to be searched and monitored. The base station further includes a transceiver connected to the processor and configured to transmit, over a downlink control channel, downlink control information including the determined window size.

20 Claims, 7 Drawing Sheets

DYNAMIC DETERMINATION AND SIGNALING OF A RAR WINDOW SIZE TO A COVERAGE ENHANCED LOW COMPLEXITY MACHINE TYPE COMMUNICATION DEVICE

BACKGROUND

A Machine Type Communication (MTC) device is a user equipment (UE) that is used by a machine for specific application. In 3$^{rd}$ Generation Partnership Project Long Term Evolution (3GPP-LTE) Release 12 (Rel-12), a work item (WI) on Low Complexity MTC (LC-MTC) UEs was concluded in which the complexity and cost of MTC UEs were reduced by approximately 50%. In Release 13 (Rel-13), another WI was agreed upon to further reduce complexity, enhance coverage and improve power consumption of MTC UEs.

One complexity and cost reduction technique is to reduce the radio-frequency (RF) bandwidth of LC-MTC UEs to 1.4 MHz (operating with 6 Physical Resource Blocks (PRBs), where a PRB is a unit of resource allocation in the frequency domain).

For a coverage enhancement (CE) aspect of this WI, one technique for reducing complexity and cost is repetition of the physical channel. However, it is expected that the number of repetitions will be relatively high (e.g., hundreds of repetitions), which may impact spectra efficiency.

SUMMARY

On example embodiment is directed to a base station configured to determine a size of a random access response window and transmit the same to a user equipment.

In one example embodiment, a base station includes a processor configured to determine a window size indicating for how long a random access response transmission by the base station is to be searched and monitored. The base station further includes a transceiver connected to the processor and configured to transmit, over a downlink control channel, downlink control information including the determined window size.

In yet another example embodiment, the processor is configured to determine the window size based on at least one of a first variable, a second variable and a third variable.

In yet another example embodiment, the first variable is a repetition level of Message1 transmitted by a user equipment to the base station requesting an establishment of a radio resource control connection with the base station.

In yet another example embodiment, the second variable is a random access response multiplexing performed by the base station.

In yet another example embodiment, the third value is an aggregation level of the downlink control information.

In yet another example embodiment, the window size is an index associated with an actual window size, and the transceiver is configured to transmit a mapping scheme to the user equipment via a radio resource control signaling message, the mapping scheme providing a mapping between the index and the actual window size.

In yet another example embodiment, the processor is further configured to include the determined window size in the downlink control information.

In yet another example embodiment, the processor is further configured to determine whether to modify the window size based on at least one of a data load and a number of user equipment serviced by the base station, and modify the window size upon determining to modify the window size. The transceiver is further configured to transmit the determined window size to the user equipment on a subsequent downlink control information included in a subsequent downlink control channel, from the base station to the user equipment.

In yet another example embodiment, the downlink control channel is an Enhanced Physical Downlink Control Channel (EPDCCH).

In yet another example embodiment, the processor is further configured to encode the downlink control information before to the transceiver transmits the downlink control information to the user equipment.

One example embodiment is directed to a method of determining a size of the random access response window and transmitting the same to a user equipment.

In one example embodiment, a method includes determining, by a base station, a window size indicating for how long a random access response to be transmitted by the base station is to be searched and monitored. The method further includes transmitting, by the base station, over a downlink control channel, downlink control information including the determined window size.

In yet another example embodiment, the determining determines the window size based on at least one of a first variable, a second variable and a third variable.

In yet another example embodiment, the first variable is a repetition level of Message1 transmitted by a user equipment to the base station requesting an establishment of a radio resource control connection with the base station.

In yet another example embodiment, the second variable is a random access response multiplexing performed by the base station.

In yet another example embodiment, the third value is an aggregation level of the downlink control information.

In yet another example embodiment, the window size is an index associated with an actual window size. The method further includes transmitting a mapping scheme to a user equipment via a radio resource control signaling message, the mapping scheme providing a mapping between the index and the actual window size.

In yet another example embodiment, the method further includes including the determined window size in the downlink control information.

In yet another example embodiment, the method further includes determining whether to modify the window size based on at least one of a data load and a number of user equipment serviced by the base station, modifying the window size upon determining to modify the window size, and transmitting the determined window size to a user equipment on a subsequent downlink control information included in a subsequent downlink control channel, from the base station to the user equipment.

In yet another example embodiment, the downlink control channel is an Enhanced Physical Downlink Control Channel (EPDCCH).

In yet another example embodiment, the method further includes encoding the downlink control information wherein the transmitting transmits the encoded downlink control information in the downlink control channel.

BRIEF DESCRIPTION OF THE DRAWINGS

The present invention will become more fully understood from the detailed description given herein below and the accompanying drawings, wherein like elements are repre

Figure 1:
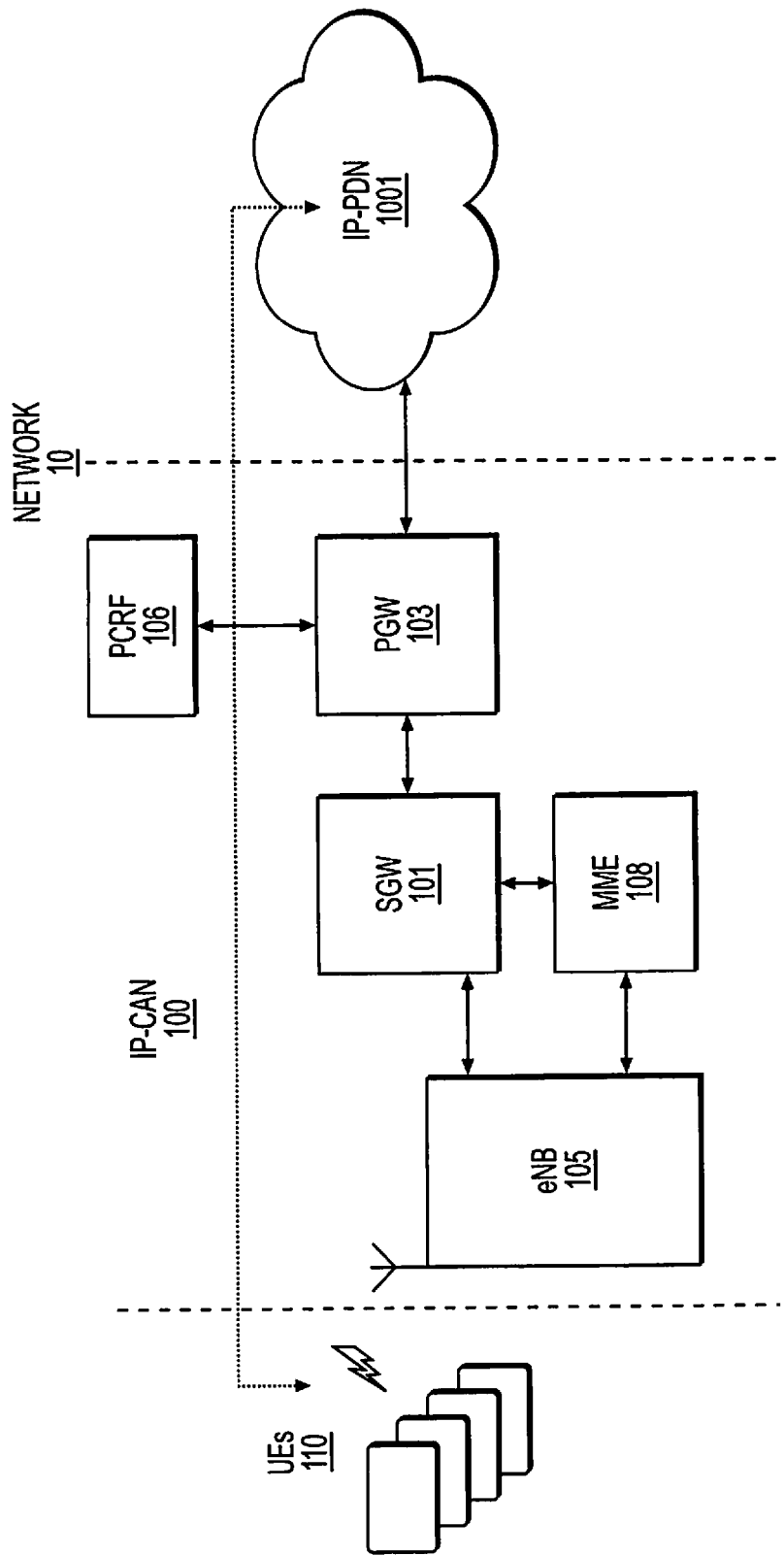
- FIG. 1 illustrates a communication network, according to one example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF EXAMPLE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing small wireless cells, base stations, NodeBs, user equipments (UEs) including LC-MTC UEs, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), macro cell, etc., and describes a device in communication with and providing wireless resources to UEs in a geographical coverage area. As discussed herein, eNBs may have all functionally associated with conventional, well-known base stations in addition to the capability and functionality discussed herein.

As used herein, the term "small wireless cell" may be considered synonymous to, and may hereafter be occasionally referred to as a micro cell, pico cell, Home NodeB (HNB), Home eNodeB (HeNB), etc., and describes a device in communication with and providing wireless resources (e.g., LTE, 3G, WiFi, etc.) to users in a geographical coverage area that is, in most cases, smaller than the geographical coverage area covered by a macro eNB or cell. As discussed herein, small wireless cells may have all functionally associated with conventional, well-known base stations in addition to the capability and functionality discussed herein. In this regard, the small wireless cells may include a base station or eNB. Small wireless cells according to at least some example embodiments may also serve as WLAN (or WiFi) access points (APs) providing WLAN (or WiFi) resources for devices within range of the small wireless cell. Although discussed with regard to macro eNBs, example embodiments may also be applicable to small wireless cells and base stations.

Generally, as discussed herein, a small wireless cell may be any well-known small wireless cell including one or more processors, various communication interfaces (e.g., LTE, WiFi and wired), a computer readable medium, memories, etc. The one or more interfaces may be configured to transmit/receive data signals via wireless connections over a WiFi and a cellular network to/from one or more other devices, and also communicate with the Internet, for example over a wired connection.

The term "user equipment" or "UE", as discussed herein, may be considered synonymous to, and may hereafter be occasionally referred to, as user, client, client device, mobile unit, mobile station, mobile user, mobile, subscriber, user, remote station, access terminal, receiver, etc., and describes a remote user of wireless resources in a wireless communication network (e.g., a $3^{rd}$ Generation Partnership Project Long-Term Evolution (3GPP LTE) network). The UEs discussed herein may be low complexity machine type communication (LC-MTC) UEs capable of operating in coverage enhanced (CE) and/or non-coverage enhanced (non-CE) modes.

According to example embodiments, UEs, small wireless base stations (or cells), eNBs, etc. may be (or include) hardware, firmware, hardware executing software, or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs), computers, or the like, configured as special purpose machines to perform the functions described herein as well as any other well-known functions of these elements. In at least some cases, CPUs, SOCs, DSPs, ASICs and FPGAs may collectively be referred to as processing circuits, processors and/or microprocessors.

FIG. 1 illustrates a communication network, according to one example embodiment. As shown in FIG. 1, the communication network 10 is a 3GPP LTE network 10. However, the communication network 10 is not limited to the 3GPP LTE network 10 of FIG. 1 and may encompass other types of communication networks as well.

Referring to FIG. 1, the network 10 includes an Internet Protocol (IP) Connectivity Access Network (IP-CAN) 100 and an IP Packet Data Network (IP-PDN) 1001. The IP-CAN 100 includes: a serving gateway (SGW) 101; a packet data network (PDN) gateway (PGW) 103; a policy and charging rules function (PCRF) 106; a mobility management entity (MME) 108 and eNode B (eNB) 105. Although not shown in FIG. 1, the IP-PDN 1001 portion of an evolved packet system (EPS) may include application and/or proxy servers, media servers, email servers, etc.

Within the IP-CAN 100, the eNB 105 is part of what is referred to as an Evolved Universal Mobile Telecommunications System (UMTS) Terrestrial Radio Access Network (EUTRAN), and the portion of the IP-CAN 100 including the SGW 101, the PGW 103, the PCRF 106, and the MME 108 is referred to as the Evolved Packet Core (EPC). Although only a single eNB 105 is shown in FIG. 1, it should be understood that the EUTRAN may include any number of eNBs. Similarly, although only a single SGW, PGW and MME are shown in FIG. 1, it should be understood that the EPC may include any number of these core network elements.

Still referring to FIG. 1, the eNB 105 provides wireless resources and radio coverage for one or more user equipments (UEs) 110. That is to say, any number of UEs 110 may be connected (or attached) to the eNB 105 to access wireless network services and resources. The eNB 105 is operatively coupled to the SGW 101 and the MME 108. Additional functionality of the eNB 105 and the UEs 110 will be discussed in more detail later.

The SGW 101 routes and forwards user data packets, while also acting as the mobility anchor for the user plane during inter-eNB handovers of UEs. The SGW 101 also acts as the anchor for mobility between 3GPP LTE and other 3GPP technologies. For idle UEs, the SGW 101 terminates the downlink data path and triggers paging when downlink data arrives for the idle UEs.

The PGW 103 provides connectivity between the UEs 110 and external packet data networks (e.g., the IP-PDN) by serving as the point of entry/exit of traffic for the UEs 110 to/from the IP-CAN 100. As is known, a given UE 110 may have simultaneous connectivity with more than one PGW 103 for accessing multiple PDNs.

Still referring to FIG. 1, eNB 105 is also operatively coupled to the MME 108. The MME 108 is the control-node for the EUTRAN, and is responsible for idle mode UE 110 paging and tagging procedures including retransmissions. The MME 108 is also responsible for choosing a particular SGW for a UE during initial attachment of the UE to the network, and during intra-LTE handover involving Core Network (CN) node relocation. The MME 108 authenticates UEs 110 by interacting with a Home Subscriber Server (HSS), which is not shown in FIG. 1.

Non Access Stratum (NAS) signaling terminates at the MME 108, and is responsible for generation and allocation of temporary identities for UEs 110. The MME 108 also checks the authorization of a UE 110 to camp on a service provider's Public Land Mobile Network (PLMN), and enforces UE 110 roaming restrictions. The MME 108 is the termination point in the network for ciphering/integrity protection for NAS signaling, and handles security key management.

The MME 108 also provides control plane functionality for mobility between LTE and 2G/3G access networks with an S3 type of interface from the SGSN (not shown) terminating at the MME 108.

Still referring to FIG. 1, the Policy and Charging Rules Function (PCRF) 106 is the entity that makes policy decisions and sets charging rules. It has access to subscriber databases and plays a role in the 3GPP architecture.

Figure 2:
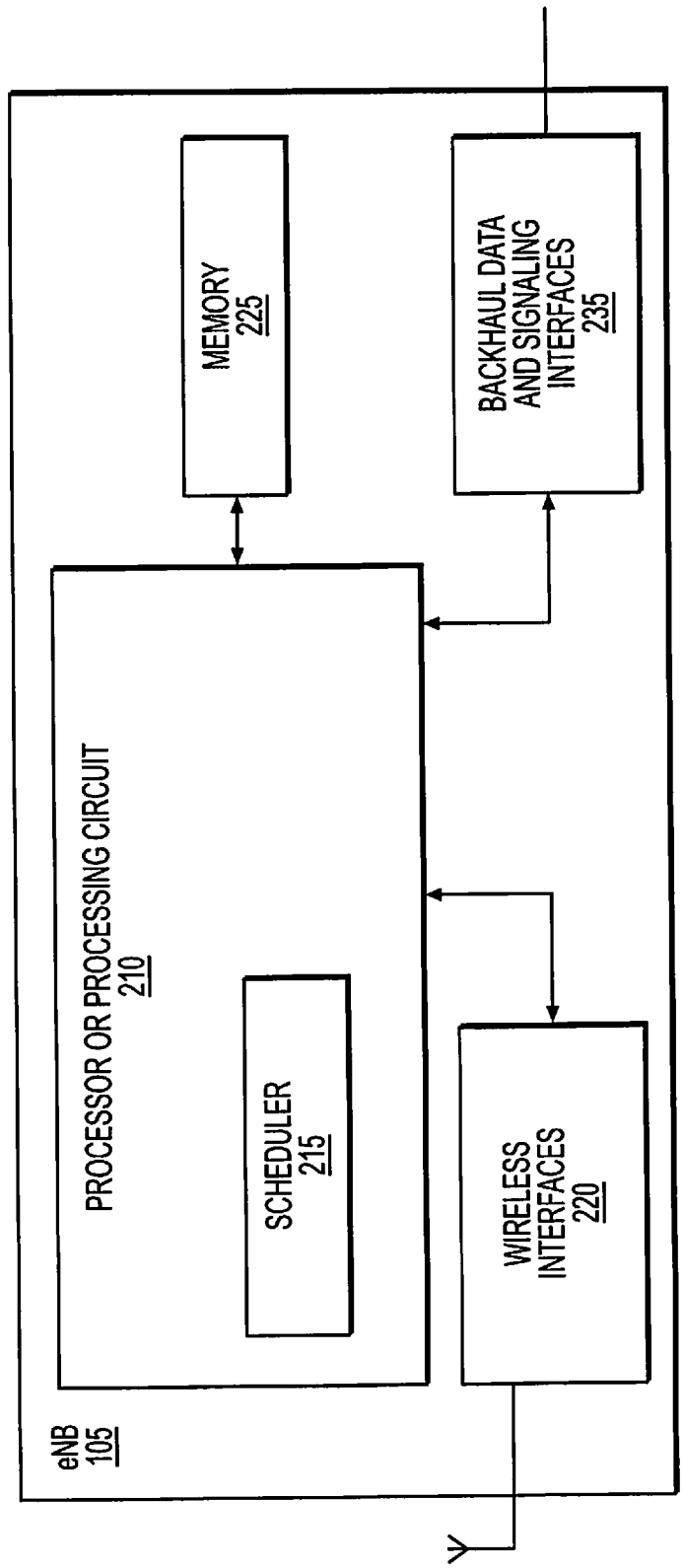
FIG. 2 illustrates an eNodeB (eNB) shown in FIG. 1, according to one example embodiment.

FIG. 2 illustrates the eNB 105 shown in FIG. 1, according to one example embodiment.

Referring to FIG. 2, the eNB 105 includes: a memory 225; a processor 210; a scheduler 215; wireless communication interfaces 220; and a backhaul data and signaling interfaces (referred to herein as backhaul interface) 235. The processor or processing circuit 210 controls the function of eNB 105 (as described herein), and is operatively coupled to the memory 225 and the communication interfaces 220. While only one processor 210 is shown in FIG. 2, it should be understood that multiple processors may be included in a typical eNB, such as the eNB 105. The functions performed by the processor may be implemented using hardware. As discussed above, such hardware may include one or more Central Processing Units (CPUs), digital signal processors (DSPs), application-specific-integrated-circuits, field programmable gate arrays (FPGAs) computers or the like. The term processor or processing circuit, used throughout this document, may refer to any of these example implementations, though the term is not limited to these examples.

Still referring to FIG. 2, the wireless communication interfaces 220 (also referred to as communication interfaces 220) include various interfaces including one or more transmitters/receivers (or transceivers) connected to one or more antennas to wirelessly transmit/receive control and data signals to/from the UEs 110, or via a control plane.

The backhaul interface 235 interfaces with the SGW 101, MME 108, other eNBs, or other EPC network elements and/or RAN elements within IP-CAN 100.

The memory 225 may buffer and store data that is being processed at eNB 105, transmitted and received to and from eNB 105.

Still referring to FIG. 2, the scheduler 215 schedules control and data communications that are to be transmitted and received by the eNB 105 to and from UEs 110. Additional functionality of the scheduler 215 and the eNB 105 will be discussed in more detail later with regard to FIGS. 4-7.

Figure 3:
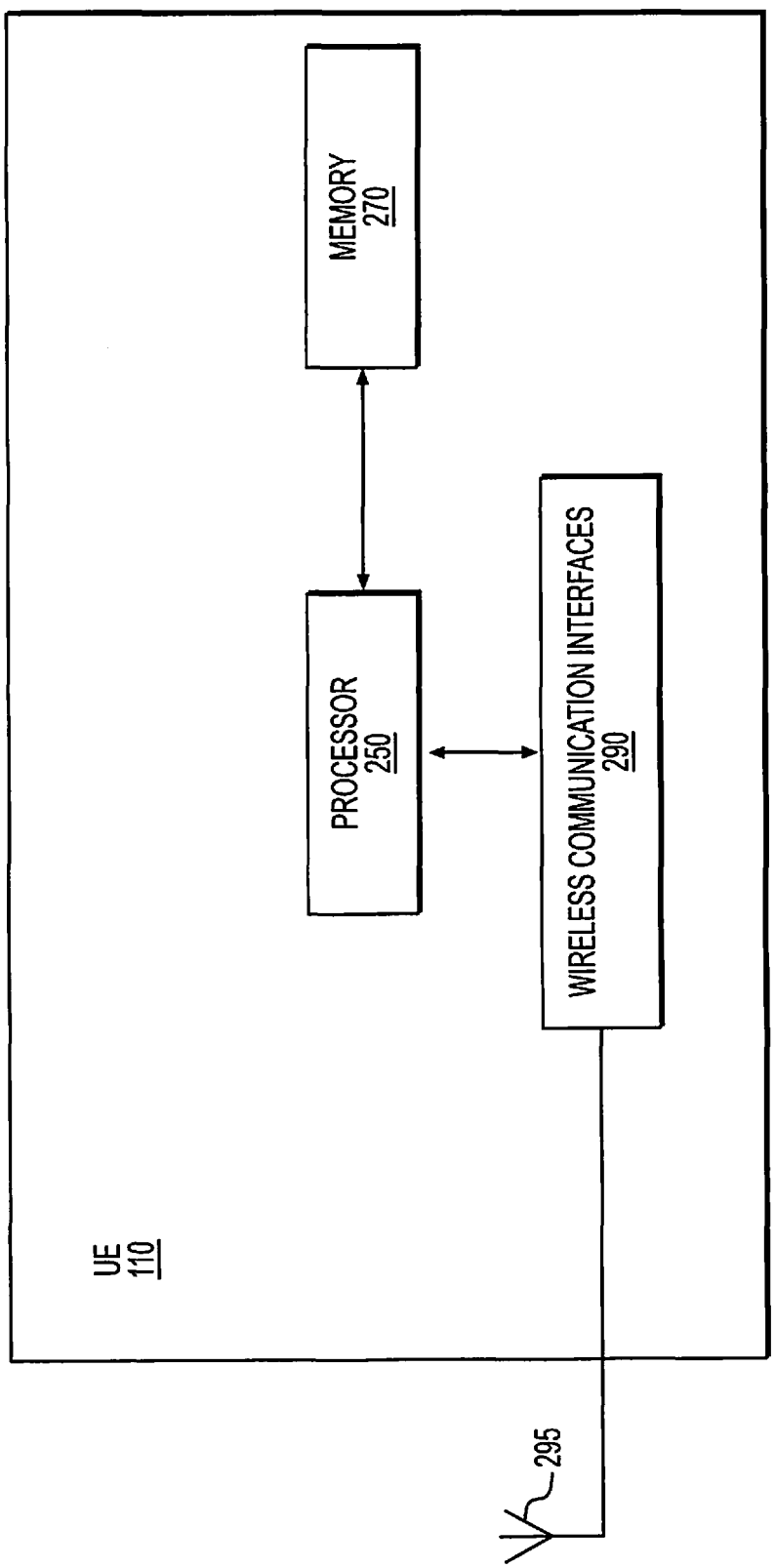
FIG. 3 illustrates a user equipment (UE) shown in FIG. 1, according to one example embodiment.

FIG. 3 illustrates the UE 110 shown in FIG. 1, according to one example embodiment.

Referring to FIG. 3, the UE 110 includes: a memory 270; a processor (or processing circuit) 250 connected to the memory 270; various interfaces 290 connected to the processor 250; and an antenna 295 connected to the various interfaces 290. The various interfaces 290 and the antenna 295 may constitute a transceiver for transmitting/receiving data from/to the eNB 105. As will be appreciated, depending on the implementation, the UE 110 may include many more components than those shown in FIG. 3. However, it is not necessary that all of these generally conventional components be shown in order to disclose the illustrative example embodiment.

The memory 270 may be a computer readable storage medium that generally includes a random access memory (RAM), read only memory (ROM), and/or a permanent mass storage device, such as a disk drive. The memory 270 also stores an operating system and any other routines/modules/applications for providing the functionalities of the UE 110 (e.g., functionalities of a UE, methods according to the example embodiments, etc.) to be executed by the processor 250. These software components may also be loaded from a separate computer readable storage medium into the memory 270 using a drive mechanism (not shown). Such separate computer readable storage medium may include a disc, tape, DVD/CD-ROM drive, memory card, or other like computer readable storage medium (not shown). In some embodiments, software components may be loaded into the memory 270 via one of the various interfaces 290, rather than via a computer readable storage medium.

The processor 250 may be configured to carry out instructions of a computer program by performing the arithmetical, logical, and input/output operations of the system. Instructions may be provided to the processor 250 by the memory 270.

The various interfaces 290 may include components that interface the processor 250 with the antenna 295, or other input/output components. As will be understood, the interfaces 290 and programs stored in the memory 270 to set forth the special purpose functionalities of the UE 110 will vary depending on the implementation of the UE 110.

When a UE (such as a UE 110 in FIG. 1) enters a coverage area of an eNB (such as the eNB 105 shown in FIG. 1), the UE attempts to establish a radio resource control (RRC) protocol connection (also referred to as a RRC connection) with the eNB to access the wireless network. As is known, the RRC protocol provides functions such as connection establishment and release functions, broadcast of system information, radio bearer establishment, reconfiguration and release, RRC connection mobility procedures, paging notification and release and outer loop power control. Through signaling functions, the RRC protocol configures the user and control planes according to status of the wireless network, and allows for implementation of Radio Resource Management strategies in the wireless network.

To initiate establishment of a RRC connection with the eNB, a UE sends a Random Access Channel (RACH)

preamble to the eNB in a first message (Msg1) via the Physical Random Access Channel (PRACH). As is known, the UE chooses the RACH preamble from among a set of 64 preamble sequences. The preamble sequence (or preamble ID) identifies the particular UE, including the type of UE and the identifier (UE ID) for the UE sending the preamble sequence. In one example, the preamble sequence may include a cyclic prefix, a sequence and a guard time. The preamble sequences may be defined from a Zadoff-Chu sequence.

In response to receiving the preamble ID from the UE on the PRACH, the eNB sends a Random Access Response (RAR) to the UE. The RAR for a particular UE may include a timing advance (TA) for the UE, a Cell Radio Network Temporary Identifier (C-RNTI) for the UE, and an uplink (UL) grant for the UE to transmit a subsequent RRC connection request to the eNB.

The RAR for the UE is multiplexed together with RARs for other UEs for which the eNB has received preamble IDs simultaneously, concurrently or within a given time window of the preamble ID from the UE. In this regard, the RARs for multiple UEs are multiplexed into RAR messages, wherein each of the RAR messages may include RARs for multiple different UEs.

Because the eNB is able to multiplex RARs for multiple different UEs in a single RAR message, the eNB also sends a control channel message corresponding to each RAR message to provide control information for decoding the PDSCH transmitted to a UE (e.g., transport block size (TBS) and modulation and coding scheme (MCS)) for decoding the RAR intended for a given UE).

The eNB sends the RAR to the UE in a given RAR message on the Physical Downlink Shared CHannel (PDSCH) along with the corresponding control channel message transmitted on a physical downlink control channel. As discussed herein, a RAR message may also be referred to as a RAR protocol data unit (PDU).

In one example embodiment, the eNB sends the control channel messages to the UEs on the Enhanced Physical Downlink Control CHannel (EPDCCH) in EPDCCH Common Search Space (CSS) subframes. The control channel messages are multiplexed with the RAR messages (e.g., in the time domain) for transmission to the UEs; that is, in this example the eNB multiplexes EPDCCH and PDSCH transmissions to the UEs such that the UEs receive a control channel message prior to receiving a corresponding RAR message.

Even if only 1 RAR is included in a RAR message, the eNB still provides the subband/physical resource block (PRB) for the resource information on the EPDCCH, unless the subband/PRB and the TBS and/or MCS is fixed in the specification or semi-statically configured in the system information blocks (SIB), which limits the scheduling flexibility at the eNB. In order to maintain the flexibility in scheduling RARs for UEs, the control channel messages are transmitted on the EPDCCH prior to transmission of the corresponding RAR message on the PDSCH. In a bandwidth limited system, the different repetition levels (even if different PRACH resources are used) may share the same subband for the control channel messages.

For a specific repetition level, the eNB must be able to respond to preamble IDs received from multiple different UEs (also referred to as PRACHs received from multiple different UEs) requesting access to the wireless network simultaneously, concurrently and/or within a given time window. Multiplexing of multiple RARs by the eNB may help in this respect. However, the eNB may also desire to spread uplink resources required for the Radio Resource Control (RRC) connection request messages from the UEs, rather than responding to all received PRACHs in one particular instance. To facilitate this spreading of uplink resources, 3GPP-LTE Release 8 (Rel-8), provides a random access (RA) response window in which the transmissions of RAR messages by the eNB are spread over a semi-statically configured period.

Conventionally, in this scenario, each UE decodes each control channel message transmitted on the EPDCCH as well as each corresponding RAR message transmitted on the PDSCH during the RA response window until the UE identifies its preamble ID in an RAR. In the case of coverage enhanced (CE) LC-MTC UEs, decoding a relatively large number of repetitions of the control channel and the PDSCH increases power consumption by the UE.

Furthermore, due to differences in repetitions of downlink control information (DCI) and RAR PDU for each repetition level, the response window size must be a function of the repetition level. Moreover, the amount of multiplexing of RAR in a RAR PDU may affect the amount of time repetitions for the RAR PDU. The aggregation level (AL) for the DCI may affect the amount of repetitions needed for the DCI, which may also affect the size of the RA response window. Accordingly, a semi-static configuration of the RA response window is relatively inefficient.

Example embodiments described below provide for a dynamic determination of the size of the RA response window and transmission (e.g., signaling) of the same to a UE. According to the example embodiments, the size of the RA response window may be determined based on factors such as repetition level of the RACH transmitted by a UE 110 to the eNB 105, the RAR multiplexing, and the DCI aggregation level (AL).

More specifically, one or more example embodiments allow for a dynamic determination of the size of the RA response window and transmission (e.g., signaling) of the same to the UE 101 by providing the RA response window size as part of the DCI transmitted to UEs on the physical downlink control channel (e.g., EPDCCH) preceding a corresponding RAR message transmitted on the downlink shared channel (e.g., PDSCH). Although example embodiments may be discussed herein with regard to the larger eNB and/or UE performing various functions, it should be understood that subcomponents of these larger devices may be performing the described functions. For example, if the eNB is described as transmitting or sending data, it should be understood that this function may also be characterized as being performed by a transceiver at the eNB.

Figure 4:
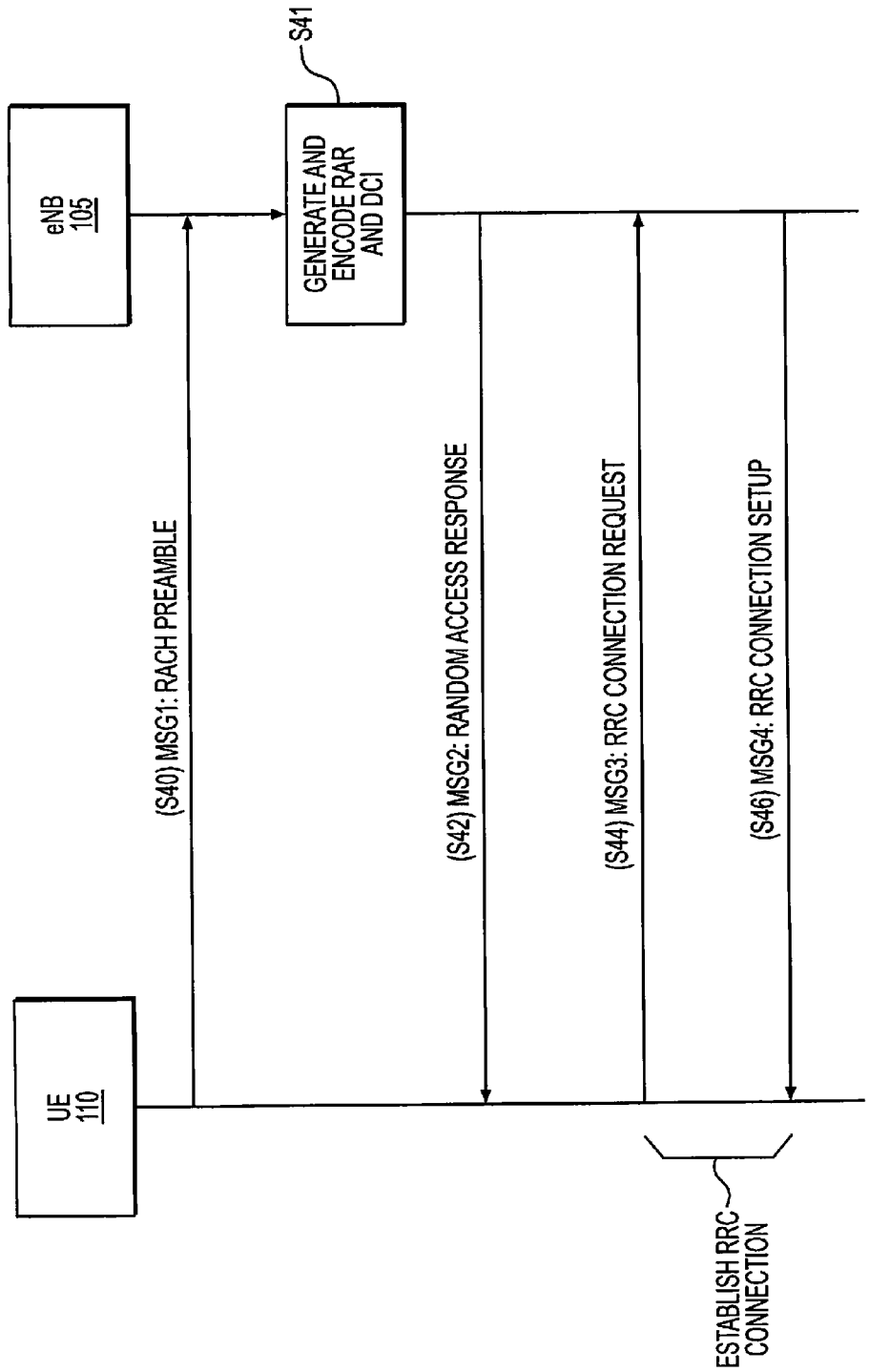
FIG. 4 is a signal flow diagram illustrating a method for establishing a radio resource control (RRC) connection between a UE and an eNB, according to one example embodiment.

FIG. 4 is a signal flow diagram illustrating a method for establishing a radio resource control (RRC) connection between a UE and an eNB, according to one example embodiment. For example purposes, the example embodiment shown in FIG. 4 will be discussed with regard to the UE 110 and the eNB 105 shown in FIGS. 1-3. However, example embodiments should not be limited to only this example.

Referring to FIG. 4, to initiate establishment of a RRC connection with the eNB 105, at S40 the UE 110 sends a RACH preamble (Msg1) to the eNB 105 via the PRACH.

In response to receiving the RACH preamble message (Msg1) from the UE 110, at S41 the scheduler 215 generates a RAR for the UE 110 to be transmitted to the UE 110 in a RAR message on the PDSCH. The scheduler 215 also generates downlink control information (DCI) for the RAR. As mentioned above, the RAR includes a timing advance (TA) for the UE, a Cell Radio Network Temporary Identifier (C-RNTI) for the UE, and an uplink (UL) grant for the UE to transmit a subsequent RRC connection request to the eNB 105. Because methods for generating RARs, and the information included therein, are well-known a detailed discussion is omitted.

The scheduler 215 encodes the RAR for transmission to the UE 110 in a RAR message on the PDSCH. The scheduler 215 also encodes the DCI for transmission to the UE 110 as a control channel message on the EPDCCH. Encoding of the DCI will be discussed in more detail later.

The DCI provides scheduling information for downlink transmissions on the PDSCH. Scheduling information may include resource assignments, such as which resource block pairs are used for a corresponding PDSCH transmission. Additionally, the DCI may provide scheduling information for uplink grant for the physical uplink shared channel (PUSCH). The DCI may also convey power control commands, Physical Multicast CHannel (PMCH) commands, and RACH commands.

According to one or more example embodiments, the encoded DCI may also serve as an indicator of the RA response window size indicating how long the UE 110 is to search for and detect a RAR intended for the UE 110.

Hereinafter, example embodiments related to the determining a size of the RA response window as well as encoding the DCI with the RA response window size, by the eNB 105, will be described.

Figure 5:
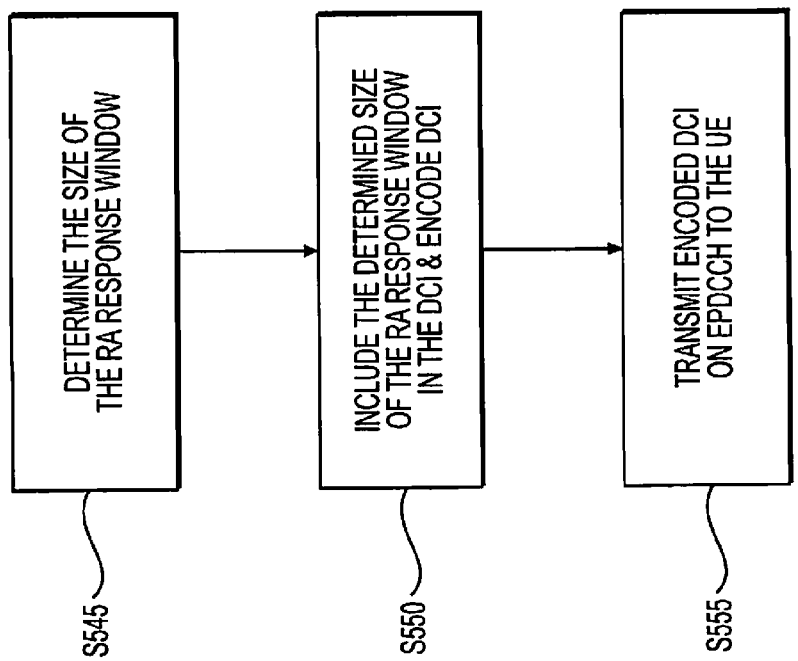
FIG. 5 is a flowchart describing a method for determining a size of the RA response window and transmitting the RA response window size to a UE, according to one example embodiment.

FIG. 5 is a flowchart describing a method for determining a size of the RA response window and transmitting the RA response window size to a UE, according to one example embodiment. FIG. 5 describes an example embodiment in which the size of the RA response window is determined by the eNB 105 based on a repetition level of Msg1 transmitted from the UE 110 to the eNB 105, which is then encoded and sent to the UE 110.

At S545, the eNB 105 determines a size of the RA response window for the UE 110.

In one example embodiment, the eNB 105 determines the size of the RA response window based on a repetition level of Msg1 sent by the UE 110 to the eNB 105 at S40, described above. For example, the repetition level may range from level 0 to level 3 where level 0 has the least number of repetitions while level 3 has the most number of repetitions. If the UE 110 transmits Msg1 with repetition level 0, then the eNB 105 determines the RA response window size as that corresponding to the repetition level 0. If the UE 110 transmits Msg1 with repetition level 3, then the eNB 105 determines the RA response window size as that corresponding to repetition level 3.

In another example embodiment, the eNB 105 determines the RA response window size based on RAR multiplexing. More specifically, the eNB 105 determines the RA response window size based on a number of RARs the eNB 105 needs to transmit to UEs and the amount of time repetition and frequency resource available to the eNB 105 for allocation to transmission of encoded DCI and the corresponding RAR message. In this example embodiment, the eNB decides how to spread the RAR over the RA response window according to the shared time and frequency resources available and the time and frequency repetitions required for allocating the Msg2, which includes the RAR, upon receiving a PRACH from the UE 110 in S40, as described above. The time and frequency resources available to the eNB 105 may be shared among various signaling messages including, but not limited to, signaling messages used for broadcasting system information, unicast messages, etc., and therefore have to be managed and appropriately allocated among different signaling messages by the eNB 105.

As a non-limiting example of determining the RA response window size based on RAR multiplexing, the eNB 105 may determine that the eNB 105 can only transmit 2 RARs per Msg2 instance and that eNB 105 has 10 RARs to transmit. Accordingly, the eNB 105 determines that eNB 105 requires 5 Msg2 instances (i.e. the size of the RA response window is 5). Each Msg2 instance corresponds to a EPDCCH (containing the RA-RNTI DCI) and its indicated Msg2.

In yet another example embodiment, the eNB 105 may determine size of the RA response window based on the DCI aggregation level (AL). AL represents the frequency repetitions of the DCI. For example, AL may have a value of 2, 4, 8 and 16. The lower the AL, the higher the time repetitions for the DCI may be. The higher the time repetitions of the DCI are, the longer the RA response window size may be. On the other hand, the higher the AL, the smaller the amount of time repetitions may be. The smaller the amount of time repetitions is, the shorter the RA window size may be. For example, if the AL is 2 instead of 4, the time repetitions of the EPDCCH DCI may double the time repetitions of the EPDCCH DCI when the AL is 4. Accordingly, the RA response window size is then increased to take the time repetitions of the EPDCCH into account.

Accordingly, in one example embodiment, in addition to being a function of the AL, the size of the RA response window is also a function of the time repetitions of the DCI and the Msg2. Such function may specified in the 3GPP specification and therefore known to the UE 110. Accordingly, upon determining the AL and the time repetitions of the DCI and Msg2, the UE may determine the RA-response window size using the function with the AL and the time repetitions of DCI and Msg2 as inputs into the function.

In yet another example embodiment, the eNB 105 may determine the size of the RA response window based on the repetition level of Msg1, the RAR multiplexing and the AL.

In one example embodiment, the eNB 105 may determine the size of the RA response window as the largest RA response window size determined based on each of the repetition level of Msg1, the RAR multiplexing and the AL.

In one example embodiment, the eNB 105 may determine the size of the RA response window as the smallest RA response window size determined based on each of the repetition level of Msg1, the RAR multiplexing and the AL.

In one example embodiment, the eNB 105 may determine the size of the RA response window as an average of the RA response window size determined based on each of the repetition level of Msg1, the RAR multiplexing and the AL.

At S550, the eNB 105, via the scheduler 215 of the processor 210, includes the size of the RA response window, as determined at S545, in the DCI (downlink control information) of the EPDCCH (downlink control channel) and encodes the DCI for transmission to the UE 110.

In one example, the scheduler 215 may encode the DCI using a RA-RNTI as shown in equation (1) below.

$$RA\text{-}RNTI = 1 + t_{id} + 10 f_{id} \quad (1)$$

In Equation 1, $t_{id}$ is the time domain index of the first subframe in which the preamble ID is transmitted to the eNB 105, and $f_{id}$ is the frequency domain index indicating the subcarrier group where the preamble ID is transmitted to the eNB 105. In at least this example, the time domain index is indicative of a subframe and has a value between 0 and 9.

In another example, the scheduler 215 encodes the DCI using a RA-RNTI, which is a function of a repetition level of Msg1 sent by the UE 110 to the eNB 105 at S40. In this example, the scheduler 215 generates the indicator based on equation (2) shown below.

$$\text{RA-RNTI} = 1 + t_{id} + 10 f_{id} + 100 * \text{RLA} \quad (2)$$

In equation (2), RLA is a value representing a repetition level of Msg1 transmitted to the eNB 105 by the UE A (e.g., in this example, UE 110 is UE A) and $t_{id}$ and $f_{id}$ are as described above with reference to equation (1).

Thereafter, at S555, the eNB 105, via the transceiver 295, transmits the encoded DCI to the UE 110 on the EPDCCH CSS. The UE 110, upon receiving the EPDCCH, decodes the DCI and retrieves the RA response window size from the DCI, using known methods (e.g., the RA-RNTI (1) or (2) used by the eNB 105 to encode the DCI is fixed in the 3GPP specification and thus is known to both the UE 110 and eNB 105). In one example embodiment, the EPDCCH is sent to the UE 110 prior to the transmission of Msg2.

In yet another example embodiment, instead of including an absolute value of the RA response window size in the DCI, the eNB 105 includes an index to the absolute value of the RA response window size in the DCI.

Figure 6:
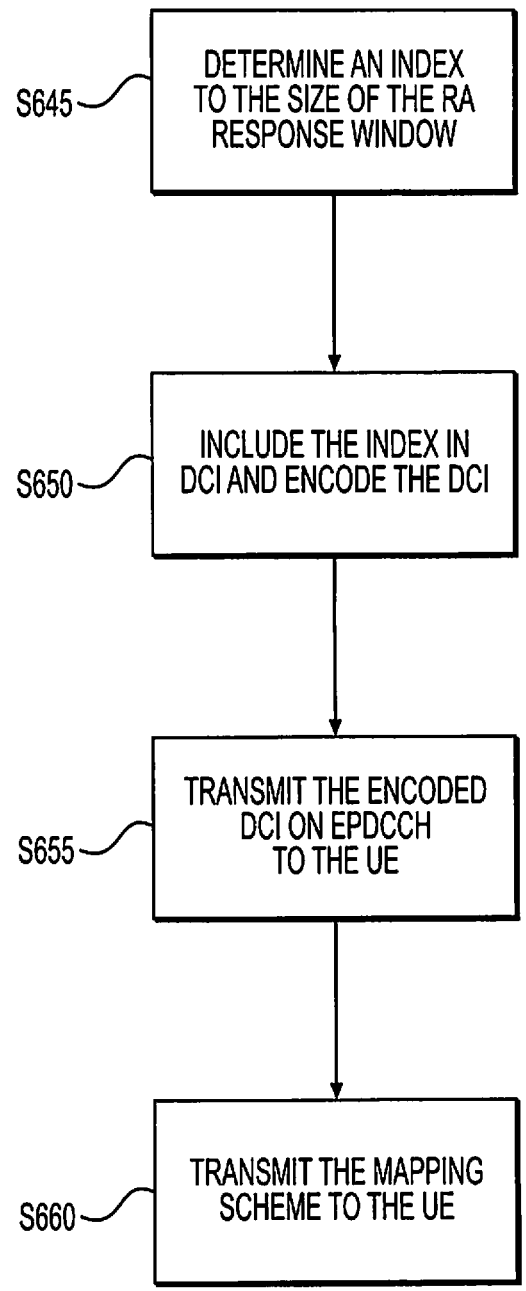
FIG. 6 is a flowchart describing a method for determining a size of the RA response window and transmitting the RA response window size to a UE, according to one example embodiment.

FIG. 6 is a flowchart describing a method for determining a size of the RA response window and transmitting the RA response window size to a UE, according to one example embodiment. FIG. 6 describes an example embodiment in which the size of the RA response window is determined by the eNB 105 based on the RAR multiplexing and thereafter encode and sent the same to the UE 110.

In FIG. 6, at S645, the eNB 105 determines a size of the RA response window for the UE 110 in the same manner as described above with reference to S545 of FIG. 5 except that instead of determining an actual (e.g., absolute) value of the size of the RA response window, the eNB determines an index associated with the actual value of the size of the RA response window.

In one example embodiment, a specific set of index may have been specified/defined according to 3GPP specification. For example, a set of index {0,1,2,3} may have been specified that correspond to actual RA response window sizes {1 ms, 2 ms, 3 ms, 4 ms} respectively.

In FIG. 6, S650 is the same as S550 described with reference to FIG. 5, except that instead of including an absolute value of the RA response window size in the DCI, the eNB 105 includes an index of the absolute value of the RA response window size in the DCI. Then the eNB 105 encodes the DCI, using one of equations (1) and (2) described above, having the index to the absolute value of RA response windows size.

Still referring to FIG. 6, S655 is the same as S555. Therefore, for the sake of brevity, S655 will not be described in greater detail. At S660, the eNB 105 transmits another message to the UE 110. The eNB 105 may transmit in the other message, a mapping scheme, which provides a mapping between the index included in the DCI sent to the UE 110 at S650, and the absolute value of the RA response window size (e.g., a mapping scheme providing the mapping between the index set {0,1,2,3} to {1 ms, 2 ms, 3 ms, 4 ms}, described above). In one example embodiment, upon decoding the DCI and retrieving the index of the RA response window size, the UE 110 determines the absolute value of the RA response window size using the mapping scheme received from the eNB at S660. The eNB 105 may provide the mapping scheme to the UE 110 before or after transmitting the index to the UE 110.

In one example embodiment, the eNB 105 sends the other message (i.e., the message for transmitting the mapping scheme) to the UE 110 at S660, via RRC signaling. The RRC signaling may be broadcasted by the eNB 105 or in the alternative, or may be a dedicated signaling between the eNB 105 and the UE 110.

In yet another example embodiment, the eNB 105 may modify the RA response window size and send the modified RA response window size to the UE 110.

Figure 7:
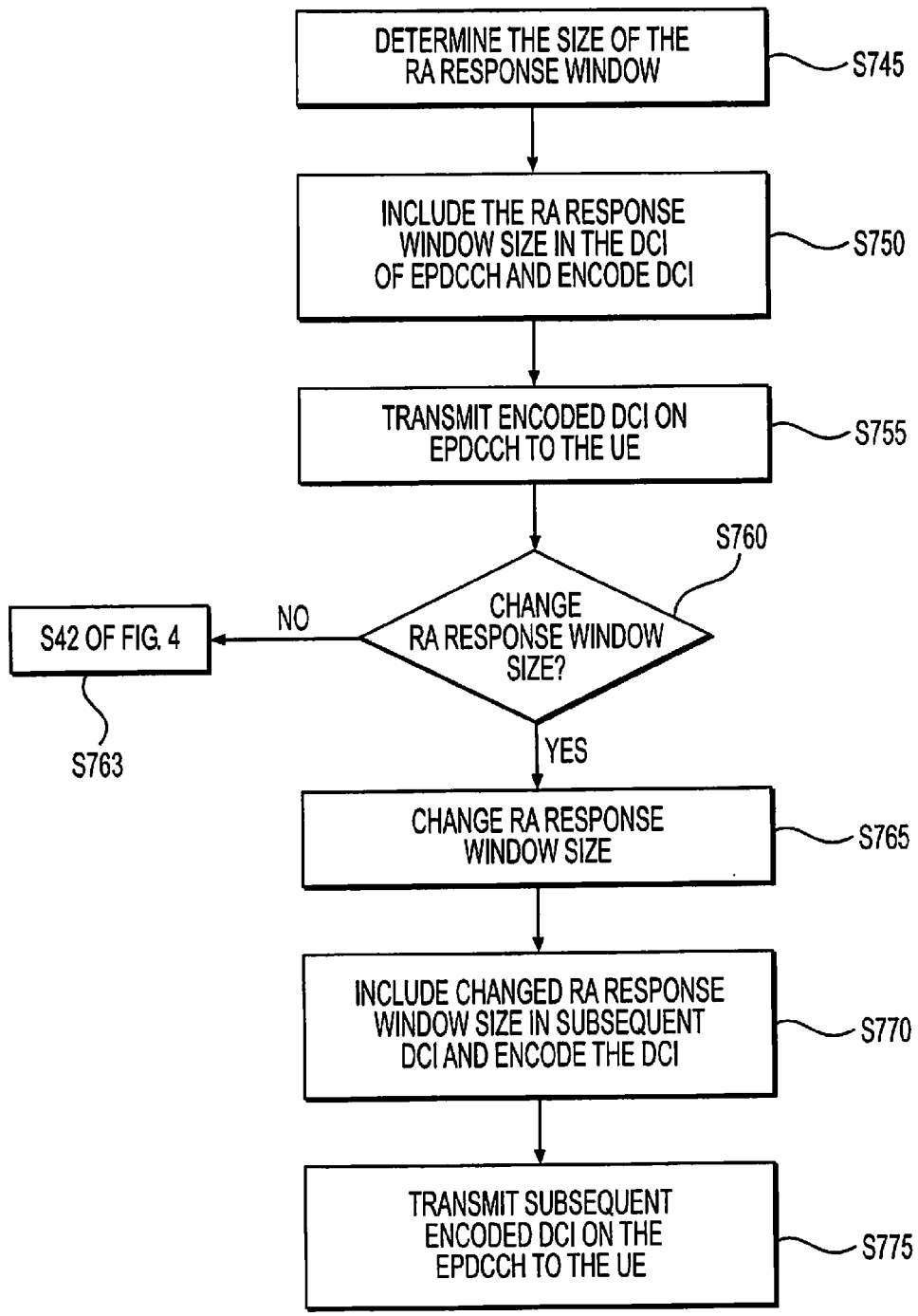
FIG. 7 is a flowchart describing a method for determining a size of the RA response window and transmitting the RA response window size to a UE, according to one example embodiment.

FIG. 7 is a flowchart describing a method for conveying a size of a RA response window to a UE, according to one example embodiment. In one example embodiment, S745 of FIG. 7 is the same as S545 of FIG. 5 described above. In yet another example embodiment, S745 of FIG. 7 is the same as the S645 of FIG. 6. Therefore, for the sake of brevity, S745 will not be described in greater detail. Moreover, S750 and S755 are the same as S550 and S555 described above with reference to FIG. 5. Therefore, for the sake of brevity, S745, S750 and S755 will not be described in greater detail.

At S760, the eNB 105 determines whether to change the RA response window size that was sent to the UE 110 at S750. In one example embodiment, the eNB 105 determines whether to change the RA response window size depending on the data load experienced by the eNB 105 and/or the number of UEs that the eNB 105 has to service. For example, if the data load experienced/number of UEs serviced by the eNB 105 is equal to or greater than a threshold, the eNB 105 may determine to change the RA response window size. If the data load experienced/number of UEs serviced by the eNB 105 is less than a threshold, the eNB 105 determines not to change the RA response window size. The threshold may be a configurable variable that may be determined based on empirical studies.

If at S760 the eNB 105 determines not to change the RA response window size, at S763, the eNB 105 may proceed to S42 of FIG. 4, which will be described below. However, if at S760, the eNB 105 determines to change the RA response window size, then at S765, the eNB 105 changes (e.g., increases or decreases the RA response window size). In one example embodiment, the eNB 105 increases the RA response window size if the data load experienced/number of UEs serviced by the eNB 105 is greater than the threshold. In one example embodiment, the eNB 105 decreases the RA response window size if the data load experienced/number of UEs serviced by the eNB 105 is less than the threshold.

Thereafter, at S770, the eNB 105 includes the changed RA response window size in a subsequent DCI and encodes the subsequent DCI for the same RA-RNTI used at S750. The encoding of the DCI to include the changed RA response window size at S770 may be performed in the same manner as the encoding of DCI in S750. Thereafter at S775, the eNB 105 transmits a subsequent EPDCCH with the subsequently encoded DCI described at S770, to the UE 110.

In one example embodiment, at S770, the eNB 105 may encode the subsequent DCI with a value indicating that the RAR (which will be sent subsequent to the EPDCCH at S770) is the last RAR and in case the UE 110 has yet to detect a RAR intended for the UE 110 (e.g., the UE 110 experiences an unsuccessful RAR detection), the UE 110 is to perform a backoff operation since no additional RARs are to be transmitted from eNB 105 to the UE 110.

Returning now to FIG. 4, after generating and encoding the RAR and DCI at S41, at S42 the eNB 105 sends the RAR (Msg2) along with the encoded DCI, to the UE 110 within the RA response window. The eNB 105 transmits the RAR to the UE 110 in a RAR message on the PDSCH and transmits the encoded DCI in a control channel of the EPDCCH. In one example embodiment, the EPDCCH and PDSCH transmissions may be multiplexed (e.g., in the time domain) such that the UE 110 receives the encoded DCI prior to receiving the corresponding RAR message. The RAR for the UE 110 may be multiplexed (e.g., in time, frequency or code) with RARs for other UEs in the RAR message.

Upon receipt, the UE 110 examines the indicator included in the DCI to retrieve the RA response window size and decide whether the corresponding RAR message includes a RAR intended for the UE 110.

If the RAR message corresponding to the decoded DCI includes a RAR intended for the UE 110, the UE 110 decodes the corresponding RAR message to obtain the RAR provided by the eNB 105 for the UE 110.

Once having obtained the RAR included in the RAR message from the eNB 105, the UE 110 and the eNB 105 exchange RRC Connection messages to establish a RRC session between the UE 110 and the wireless network using the resources granted by the eNB 105 in the obtained RAR. In more detail, as shown in FIG. 4, at S44 the UE 110 sends a RRC connection request message (Msg3) to the eNB 105 using the resources granted to the UE 110 in the RAR intended for the UE 110.

In response to the RRC connection request message, at S46 the eNB 105 sends a RRC connection setup message (Msg4) to establish the RRC connection between the UE 110 and the eNB 105.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A base station comprising:
a processor configured to execute the computer-readable instructions to determine a window size indicating how long a user equipment communicating with the base station is to monitor and search for a random access response transmitted by the base station and intended for the user equipment, determine whether to modify the window size based on at least one of a data load and a number of user equipment serviced by the base station, and modify the window size upon determining to modify the window size; and
a transceiver configured to transmit the determined window size to the user equipment on downlink control information included in a downlink control channel, from the base station to the user equipment, and transmit the modified window size to the user equipment on a subsequent downlink control information included in a subsequent downlink control channel, from the base station to the user equipment.

2. The base station of claim 1, wherein the processor is configured to determine the window size based on at least one of a first variable, a second variable and a third variable.

3. The base station of claim 2, wherein the first variable is a repetition level of Message 1 transmitted by a user equipment to the base station requesting an establishment of a radio resource control connection with the base station.

4. The base station of claim 2, wherein the second variable is a random access response multiplexing performed by the base station.

5. The base station of claim 2, wherein the third value is an aggregation level of the downlink control information.

6. The base station of claim 1, wherein
the window size is an index associated with an actual window size, and
the transceiver is configured to transmit a mapping scheme to the user equipment via a radio resource control signaling message, the mapping scheme providing a mapping between the index and the actual window size.

7. The base station of claim 1, wherein the processor is further configured to include the determined window size in the downlink control information.

8. The base station of claim 1, wherein the downlink control channel is an Enhanced Physical Downlink Control Channel (EPDCCH).

9. The base station of claim 1, wherein the processor is further configured to encode the downlink control information before to the transceiver transmits the downlink control information to the user equipment.

10. A method comprising:
determining, by a processor, a window indicating how long a user equipment communicating with the base station is to monitor and search for a random access response transmitted by the base station and intended for the user equipment;
transmitting the determined window size to the user equipment on downlink control information included in a downlink control channel, from the base station to the user equipment;
determining whether to modify the determined window size based on at least one of a data load and a number of user equipment serviced by the base station;
modifying the determined window size upon determining to modify the window size; and
transmitting the modified window size to the user equipment on a subsequent downlink control information included in a subsequent downlink control channel, from the base station to the user equipment.

11. The method of claim 10, wherein the determining determines the window size based on at least one of a first variable, a second variable and a third variable.

12. The method of claim 11, wherein the first variable is a repetition level of Message1 transmitted by the user equipment to the base station requesting an establishment of a radio resource control connection with the base station.

13. The method of claim 11, wherein the second variable is a random access response multiplexing performed by the base station.

14. The method of claim 10, wherein
the window size is an index associated with an actual window size, and
the method further comprises:
transmitting a mapping scheme to the user equipment via a radio resource control signaling message, the mapping scheme providing a mapping between the index and the actual window size.

15. The method of claim 11, wherein the third value is an aggregation level of the downlink control information.

16. The method of claim 1, further comprising:
including the determined window size in the downlink control information.

17. The method of claim 10, wherein the downlink control channel is an Enhanced Physical Downlink Control Channel (EPDCCH).

18. The method of claim 10, further comprising:
encoding the downlink control information, wherein the transmitting transmits the encoded downlink control information in the downlink control channel.

19. A base station comprising:
a processor configured to execute computer-readable instructions to determine a window size based on a random access response multiplexing performed by the base station, a repetition level of a message transmitted by a user equipment to the base station requesting an establishment of a radio resource control connection with the base station, and an aggregation level of the downlink control information, the window size indicating how long a user equipment communicating with the base station is to monitor and search for a random access response transmitted by the base station and intended for the user equipment; and
a transceiver configured to transmit the determined window size to the user equipment on downlink control information included in a downlink control channel.

20. A method comprising:
determining, by a processor, a window size based on a random access response multiplexing performed by the base station, a repetition level of a message transmitted by a user equipment to the base station requesting an establishment of a radio resource control connection with the base station and an aggregation level of the downlink control information, the window size indicating how long a user equipment communicating with the base station is to monitor and search for a random access response transmitted by the base station and intended for the user equipment; and
transmitting the determined window size to the user equipment on downlink control information included in a downlink control channel, from the base station to the user equipment.

* * * * *